(12) United States Patent
Schwoerer et al.

(10) Patent No.: US 7,933,616 B2
(45) Date of Patent: Apr. 26, 2011

(54) METHOD OF ESTIMATING THE DISTANCE BETWEEN TWO RADIO EQUIPMENTS

(75) Inventors: Jean Schwoerer, Grenoble (FR); Benoît Miscopein, Grenoble (FR)

(73) Assignee: France Telecom, Paris (FR)

( * ) Notice: Subject to any disclaimer, the term of this patent is extended or adjusted under 35 U.S.C. 154(b) by 668 days.

(21) Appl. No.: 11/982,504

(22) Filed: Nov. 1, 2007

(65) Prior Publication Data

US 2008/0146262 A1    Jun. 19, 2008

(30) Foreign Application Priority Data

Nov. 7, 2006    (FR) ..................................... 06 54759

(51) Int. Cl.
| | |
|---|---|
| H04B 1/00 | (2006.01) |
| H04B 7/00 | (2006.01) |
| H04B 17/00 | (2006.01) |
| H04B 7/02 | (2006.01) |
| H04J 9/00 | (2006.01) |
| H04J 1/00 | (2006.01) |
| H04L 5/04 | (2006.01) |
| H04L 12/16 | (2006.01) |
| H04L 12/28 | (2006.01) |
| H04L 12/56 | (2006.01) |
| H04L 27/28 | (2006.01) |
| H04Q 11/00 | (2006.01) |
| H04W 4/00 | (2009.01) |
| H04K 1/10 | (2006.01) |

(52) U.S. Cl. ....... 455/500; 455/69; 455/67.11; 375/260; 375/267; 370/204; 370/264; 370/490; 370/487; 370/334; 370/400

(58) Field of Classification Search ............... 455/67.11, 455/69, 500; 375/267, 260; 370/204, 264, 370/490, 487, 334, 400
See application file for complete search history.

(56) References Cited

U.S. PATENT DOCUMENTS 6,453,168 B1    9/2002    McCrady et al.
(Continued)

FOREIGN PATENT DOCUMENTS

| EP | 1 253 437 | 10/2002 |
|---|---|---|
| WO | WO 2006/072697 | 7/2006 |
| WO | WO 2006/072698 | 7/2006 |

OTHER PUBLICATIONS

B. Denis, "Applications de Radiolocalisation dans les réseaux sans-fils Utra-Large Bande", http://gdr-ondes.lss.supelec.fr/actu/271006Denis.pdf>, pp. 1-35, Oct. 27, 2006.

(Continued)

*Primary Examiner* — Matthew D. Anderson
*Assistant Examiner* — Bobbak Safaipour
(74) *Attorney, Agent, or Firm* — Cohen Pontani Lieberman & Pavane LLP (57) ABSTRACT

The method comprises a phase, applied by the first equipment (A), for estimating a first time of flight between the two equipments (A, Z) corresponding to the signal transmission time to go from one equipment to the other along a propagation path, called the "strongest path", taken by a main part of the energy of the signals, a phase for estimating a difference in time of flight comprising the sending of a channel sounding frame by the first equipment to the second and, from the received radio signals corresponding to said channel sounding frame, estimating a difference in time of flight between the strongest propagation path and a first propagation path, performed by the second equipment, and a phase for calculating the distance between the two equipments (A, Z) comprising the determination of a second time of flight by subtracting the estimated difference in time of flight from the estimated first time of flight (E30) and calculating the distance between the two equipments from the duly determined second time of flight.

12 Claims, 3 Drawing Sheets

U.S. PATENT DOCUMENTS

| | | | | |
|---|---|---|---|---|
| 7,711,061 B2* | 5/2010 | Trachewsky | | 375/267 |
| 2001/0053699 A1* | 12/2001 | McCrady et al. | | 455/513 |
| 2003/0060166 A1* | 3/2003 | Rosenfeld | | 455/67.6 |
| 2004/0095907 A1* | 5/2004 | Agee et al. | | 370/334 |
| 2008/0014870 A1* | 1/2008 | Kim | | 455/69 |
| 2008/0284564 A1* | 11/2008 | Leitch | | 340/5.61 |
| 2009/0270042 A1* | 10/2009 | Miscopein et al. | | 455/67.11 |
| 2009/0298436 A1* | 12/2009 | Miscopein et al. | | 455/67.11 |
| 2010/0210219 A1* | 8/2010 | Stirling-Gallacher et al. | | 455/67.11 |

OTHER PUBLICATIONS

Woon-Yong Park et al., "A Novel ranging method using energy window bank in non-coherent UWB systems", IEICE Transactions on Fundamentals of Electronics, Communications and Computer Sciences Inst. Electron. Inf. & Commun., vol. E89-A, No. 6, pp. 1766-1770, Jun. 2006.

B. Denis et al, "Impact of NLOS propagation upon ranging precision in UWB systems", Ultra Wideband Systems and Technologies, 2003 IEEE Conference Nov. 16-19, pp. 379-383.

* cited by examiner

METHOD OF ESTIMATING THE DISTANCE BETWEEN TWO RADIO EQUIPMENTS

RELATED APPLICATION

This application claims the priority of French application no. 06/54759 filed Nov. 7, 2006, the entire content of which is hereby incorporated by reference.

FIELD OF THE INVENTION

The invention relates to a method of estimating the distance between two radio equipments.

BACKGROUND OF THE INVENTION

The position of a radio equipment is information that needs to be known in the context of numerous applications. By way of illustrative examples, the "push" type services supplying user's mobile terminals with contextual information according to their position, guide services for the person in a place like a museum, or even the routing of data packets through a meshed network or an ad hoc network can be mentioned.

Among the various existing positioning techniques, there are those that are based on a cooperative calculation of distance between radio equipments ("ranging") simply by measuring the time of flight of the radio signal. Knowing the speed of propagation of the electromagnetic wave, the measurement of the time of flight between two radio equipments makes it possible to work out the straight-line, or direct-line, distance separating the two equipments. It should be stated right away that the term "time of flight between two equipments" should be understood to mean the transmission time of the electromagnetic wave to go from one of the equipments to the other (in just one direction). The cooperative distance calculation techniques most commonly rely on the following estimation method:

a) a first equipment sends to a second equipment a request to measure an exchange time $T_{ex}$ between the two equipments and initiates a count of the time, b) after receiving the request, the second equipment allows a wait time $T_w$ to elapse, the wait time being known to both equipments, then responds to the first equipment by sending an acknowledgement ACK, c) on receiving the acknowledgement ACK, the first equipment stops counting the time, in order to measure the exchange time $T_{ex}$, then calculates the time of flight TOF from the first to the second equipment by subtracting the time delay $T_w$ of the measured exchange time $T_{ex}$ and by dividing the result of this subtraction by two, d) knowing the time of flight TOF and the speed of propagation of the electromagnetic wave V, the first equipment calculates the straight-line distance D between the two equipments by dividing the exchange time $T_{ex}$ by the speed V, the assumption being that the radio signals (go and return) of the exchange, the duration $T_{ex}$ of which has been measured, have taken direct-line propagation paths.

Thus, the estimation of the time of flight TOF between the first and the second equipment results from a measurement of the duration of an exchange, that is, a round trip, between the two equipments. Such a round-trip measurement is necessary in the case where the two equipments are asynchronous, that is, not synchronized on a common clock, and do not therefore share the same time reference. Should the two equipments be synchronous, it would be sufficient to measure the duration of a transmission from one equipment to the other, in just one direction.

The method of estimating the time of flight TOF, as explained previously, gives good results when the two equipments are remote from each other. Indeed, in this case, the assumption according to which the signals of the exchange, the duration $T_{ex}$ of which is measured, follow the propagation paths, go and return, in direct lines, is an acceptable approximation, which makes it possible to estimate the straight-line distance D between the two equipments with good accuracy. However, when the two equipments are relatively close to each other and in an environment favoring multiple propagation paths, as is the case, for example, in a building, the measurement of the exchange time $T_{ex}$ between the two equipments risks being strongly affected by multiple propagation paths. The result of this is that the assumption according to which the signals of the exchange, the duration $T_{ex}$ of which is measured, take straight-line propagation paths (go and return) becomes a rough approximation, which corrupts the estimation of the straight-line distance D between the two equipments with a significant error. In practice, the exchange time $T_{ex}$ is measured for go and return propagation paths each followed by a main part of the energy of the signal (go signal carrying the request and return signal carrying the acknowledgement). A propagation path followed by the main part of the energy of the signal will hereinafter be called the "strongest path", in the interests of conciseness. The equipments are synchronized on the strongest path. Now, in the case of propagation of the signal along multiple paths, the strongest path does not necessarily correspond to the straight-line propagation path between the two equipments. In practice, a secondary, weaker, part of the energy of the signal can take a shorter propagation path, in a straight line or very close to a straight line. This secondary part of the signal is received before the strongest path by the receiving equipment. The propagation path taken by the part of the energy of the signal received first will hereinafter be called "first propagation path" or "shortest path". Finally, in the case where the equipments are close and in an environment likely to give rise to multiple propagation paths, the offset that can exist between the time of arrival of the part of the signal that has taken the strongest path and the time of arrival of the part of the signal that has taken the first path is likely to corrupt the estimation of the straight-line distance D between the two equipments by a significant error.

To correct this error, document WO 2006/072697 proposes a method of measuring the distance between a first and a second radio equipment that proceeds in two phases. In the first phase, the steps a) to d) described previously are carried out so that the first equipment estimates a first time of flight $TOF_1$. In the second phase, the second equipment sends the first a channel sounding frame. This frame is designed for the first equipment to detect, from the different radio signals received corresponding to the sounding frame, the strongest path and the first path. The first equipment can thus estimate a difference in time of flight $\Delta TOF$ between these two paths and calculate a second time of flight $TOF_2$, or corrected time of flight, by subtracting the determined difference in time of flight $\Delta TOF$ from the first measured time of flight $TOF_1$.

This method of estimating the distance between two radio equipments can be used in an ad hoc network of nodes to enable in particular a new node Z arriving in the network to be located. However, applying this method is very costly in terms of energy consumption for the node Z to be located. In practice, it requires three separate measurements, respectively initiated by three different nodes, here denoted A, B and C. The node Z must consequently send three sounding frames to these three nodes A, B and C respectively. Now, transmitting these sounding frames consumes energy.

SUMMARY OF THE INVENTION

One object of the present invention is to overcome the above-described drawback.

This and other objects are attained in accordance with one aspect of the present invention directed to a method of estimating the distance between a first and a second radio equipment comprising:

a phase, applied by the first equipment, for estimating a first time of flight between the two equipments corresponding to the signal transmission time to go from one equipment to the other along a propagation path, called the "strongest path", taken by a main part of the energy of the signals, a phase for estimating a difference in time of flight comprising the sending of a channel sounding frame from one equipment to the other and, from the received radio signals corresponding to said channel sounding frame, estimating a difference in time of flight between the strongest propagation path and a first propagation path, a phase for calculating the distance between the two equipments comprising the determination of a second time of flight by subtracting the estimated difference in time of flight from the estimated first time of flight and calculating the distance between the two equipments from the duly determined second time of flight, wherein it is the first equipment which sends to the second said channel sounding frame, the estimating of the difference in time of flight being performed by the second equipment.

According to an embodiment of the invention, it is the equipment that has made a first estimation of the distance between the two equipments that itself sends the channel sounding frame. Thus, to take up the above-mentioned example of the location of a new node Z by three nodes A, B and C in an ad hoc network, the invention makes it possible to spread the load of the transmission of the three channel sounding frames over the three requesting nodes A, B, C and not on the new node Z. The invention also makes it possible to better distribute the electromagnetic energy in space by avoiding the transmission of three fairly energy-intensive frames from the same location, which reduces the impact of the electromagnetic waves on the users and on the radio systems located nearby.

Advantageously, the first equipment transmits to the second equipment the value of the estimated first time of flight and the second equipment estimates the second time of flight and deduces from this the distance between the two equipments.

According to an embodiment of the invention, it is the equipment polled by the request that measures the difference in time of flight between the strongest path and the first path, then, if necessary, estimates the second time of flight and calculates the distance between the two equipments. This enables the polled equipment to decide on its own to send or not send to the requesting equipment, or initiator, information relating to the measurement that it has carried out (measured difference in time of flight, second time of flight estimated from this difference or distance calculated on the basis of the second time of flight) and, consequently, to retain control of this information which can be confidential.

In a particular embodiment, the second equipment transmits to the first the estimated distance value between the two equipments. Thus, the second equipment can decide to communicate the distance measured between the two to the first equipment.

Advantageously, the second equipment sending an acknowledgement in response to a request from the first equipment in the phase for estimating the first time of flight, the first equipment allows a time T to elapse between the time of arrival of the acknowledgement and the time of transmission of the channel sounding frame, said time T comprising a guard time adapted to allow the first equipment to estimate the first time of flight followed by a pause time adapted to comply with the conditions of shared access to the channel and being such that the total duration of the phase for estimating the first time of flight and the phase for estimating a difference in time of flight is less than the channel coherence time.

Thus, the sending of the channel sounding frame by the first equipment can be carried out while complying with the channel access sharing mechanisms. This avoids any arbitrary pre-emption of the channel by the first equipment for a long time, necessary for the sending of the sounding frame, and therefore the attendant risk of collision. Furthermore, this time T is adapted for the first two phases (estimation of the first time of flight and estimation of the difference in time of flight) to have an overall duration less than the channel coherence time, defined as the time during which the properties of the channel do not significantly alter. There is thus an assurance that the channel has remained stable between the measurement of the first time of flight and the measurement of the difference in time of flight.

Another aspect of the invention relates to a device for estimating the distance between a first and a second equipment, said device being intended to be incorporated in the first equipment and comprising means of sending to the second equipment a request for the purposes of measuring an exchange duration between the two equipments, means for receiving an acknowledgement in response to the request, means of measuring the duration of the exchange between the two equipments and means of sending a channel sounding frame to the second equipment.

Another aspect of the invention relates to a device for estimating the distance between a first and a second equipment, said equipment being intended to be incorporated in the second equipment and comprising means for, on receiving a request for the purposes of measuring an exchange duration between the two equipments, sending an acknowledgement, means for receiving a channel sounding frame and, from the received radio signals corresponding to said channel sounding frame, for estimating a difference in time of flight between the strongest propagation path, taken by a main part of the energy of the signals received, and a first propagation path.

DETAILED DESCRIPTION OF THE DRAWINGS

Figure 1:
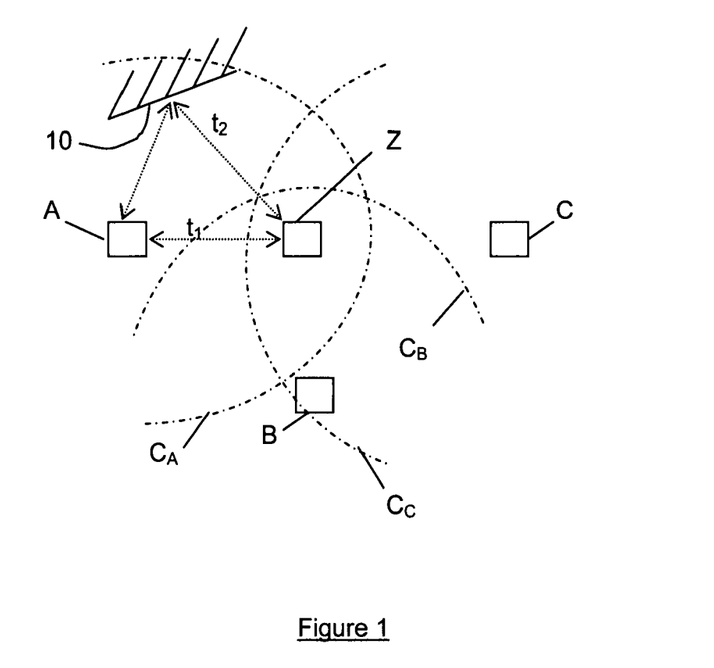
FIG. 1 represents a system of communication by radio channel intended to apply the inventive method, according to a described particular mode.

FIG. 1 represents a communication system comprising a plurality of equipments, referenced A, B, C and Z, each comprising a radio transmission and reception interface. In the particular example described, the equipments are sensors belonging to a home automation management system and form an ad hoc network. This system is intended to pick up information relating to the environment inside a home, such as the temperature, brightness, sound level, and so on. The circles $C_A$, $C_B$ and $C_C$ represent the boundaries of the respective range areas, or cells, of the equipments A, B and C. As can be seen in FIG. 1, the equipment Z is located in the respective range areas of each of the three equipments A, B and C.

Figure 2:
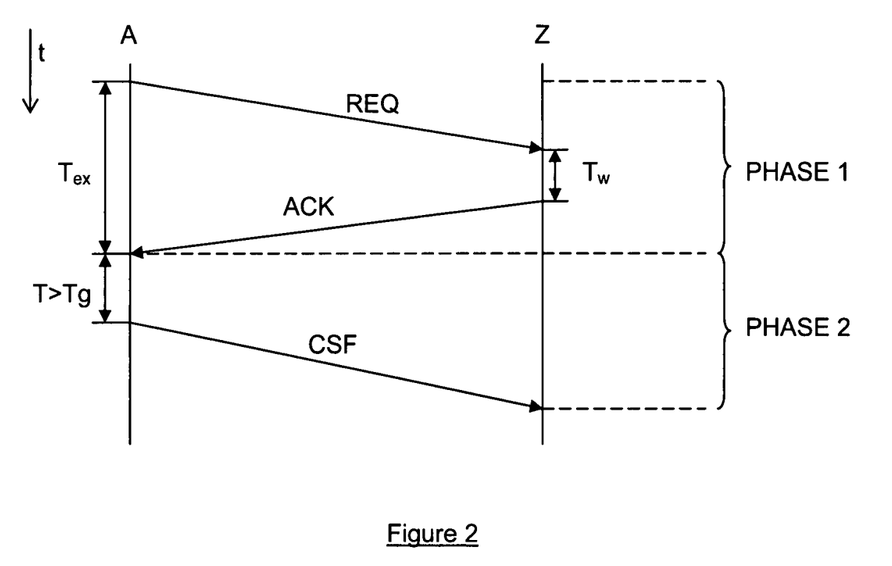
FIG. 2 represents the exchanges of frames between the two equipments, according to a particular embodiment of the inventive method.
Figure 3:
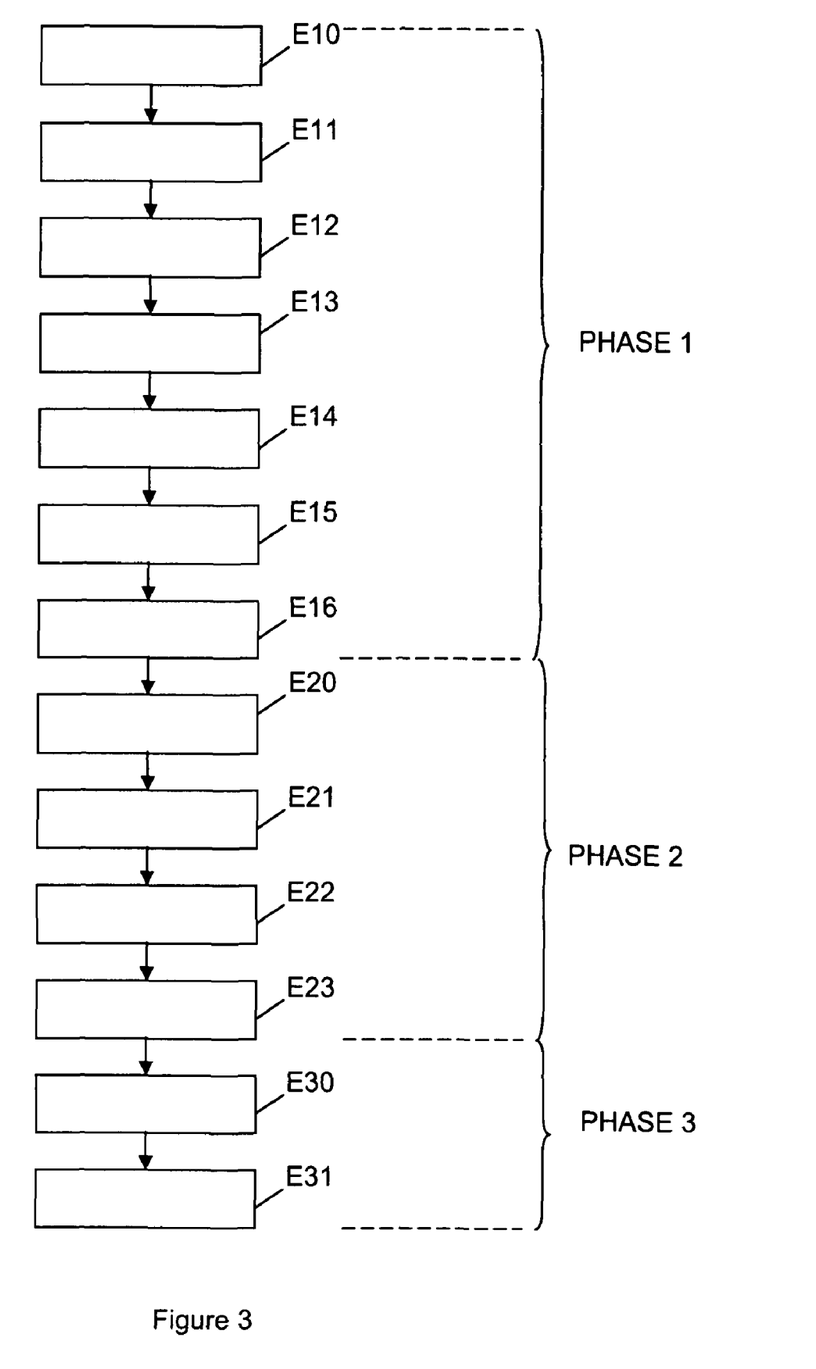
FIG. 3 represents a flow diagram of the various steps of the method according to the embodiment of FIG. 2.

With reference to FIGS. 2 and 3, there now follows a description of a first particular embodiment of the inventive method for estimating the distance between the equipment Z and one of the other three equipments, for example A. In FIG. 2, the direction of the arrow t represents the time dimension.

The method comprises a phase 1, applied by the equipment A, for estimating a first time of flight $TOF_1$ between the two equipments A and Z. This phase 1 comprises a number of steps referenced E10 to E16. In the step E10, the equipment A, in this case the initiator, sends to the equipment Z, the polled equipment, a request, denoted REQ, for the purposes of measuring the distance between the two equipments A and Z. At the moment when it sends this request, the equipment A memorizes the time of transmission of the request and initiates a count of the time from this instant.

The equipment Z receives the request REQ in the step E11 and, in response, sends an acknowledgement, denoted ACK, to the equipment A, in the step E13. It will be noted that, if the equipment Z does not want to be located, all that is needed is for it not to send an acknowledgement in response to the request REQ. Between the moment when it receives the request REQ (step E11) and the moment when it sends the acknowledgement ACK (step E13), the equipment Z allows a wait time $T_w$ to elapse in the step E12, this wait time being known to both equipments A and Z. To send the acknowledgement ACK accurately at the end of the wait time $T_w$, the equipment Z, if necessary, performs an arbitrary pre-emption of the channel, without taking account of the shared access conditions of the latter. However, since the acknowledgement is carried by a single data frame, of short duration, of the order of a few tens of microseconds, the arbitrary occupancy of the channel by the equipment Z is brief. This minimizes in particular the risks of collision with the traffic between the equipment Z and the equipment C or the equipment B, which are out of radio range of the equipment A and cannot therefore know that a distance estimation is in progress.

In the step E14, the equipment A receives the acknowledgement ACK and then stops the count of the time in order to determine the time of arrival of the acknowledgement ACK. In the step E15, from the memorized time of transmission of the request REQ and the time of arrival of the acknowledgement ACK, the equipment A measures the duration of the exchange between the two equipments A and Z, denoted $T_{ex}$, that is, the duration between the transmission of the request REQ and the reception of the acknowledgement ACK in return. In the step E16, the equipment A subtracts from the measured exchange time $T_{ex}$ the wait time $T_w$ and divides the result of this subtraction by two to deduce from it a first time of flight $TOF_1$ between the two equipments A and Z, that is, a first estimation of the signal transmission time to go from one to the other of the equipments. The first time of flight $TOF_1$ corresponds to the signal transmission time to go from one equipment to the other following a propagation path taken by a main part of the energy of the signals, namely the "strongest path".

In the particular example that has just been described, it is the equipment A performing the estimation of the first time of flight $TOF_1$ which, on its own initiative, starts the process of estimating the distance between A and Z, by sending a request to the equipment Z. As a variant, it would be possible to envisage having the equipment Z send a preliminary request to the equipment A, to request it to initiate the implementation of the process of estimating the distance between A and Z. In this case, on receiving this preliminary request, the equipment A would initiate the execution of the steps E10 to E16 in accordance with what has just been described.

As can be seen in FIG. 1, the signals transmitted from one to the other of the equipments A and Z can follow at least two separate propagation paths, respectively denoted $t_1$ and $t_2$. There could be others. The path $t_1$ corresponds to the straight-line propagation path, or the shortest path, between A and Z, whereas the path $t_2$ here includes an intermediate reflection on a surface 10. In the particular example described, it is assumed that the path $t_2$ is the "strongest path" in the go direction (from A to Z) and in the return direction (from Z to A), the channel being bijective. In other words, when the request REQ is transmitted, a main part of the energy of the transmitted signals corresponding to this request REQ takes the path $t_2$. Similarly, when the acknowledgement ACK is transmitted, a main part of the energy of the signals corresponding to this acknowledgement ACK takes the path $t_2$. The first measured time of flight $TOF_1$ therefore corresponds to the transmission duration of those of the transmitted signals that have taken the path $t_2$. It is therefore corrupted by an error corresponding to the difference between the time of flight along the strongest path $t_2$ and the time of flight along the shortest path, or "first path", $t_1$.

A phase 2 for estimating a difference in time of flight is then carried out. This phase 2 comprises the steps E20 to E23. In the step E21, the equipment A having performed the first estimation of the distance $TOF_1$ sends to the polled equipment Z a channel sounding frame "CSF". In the particular example described here, this frame CSF contains the value of the estimated first time of flight $TOF_1$. The step E21 for transmission of the frame CSF is preceded by a step E20 during which the equipment A allows a time T to elapse, counted from the time of arrival of the acknowledgement ACK. This time T here comprises a guard time $T_g$, of sufficient duration to allow the equipment A to estimate the first time of flight $TOF_1$, followed by a pause time $T_p$ to comply with the shared channel access conditions. Thus, the transmission of the frame CSF in the step E21, of long duration, of the order of a few milliseconds, does not require the prolonged arbitrary pre-emption of the channel. The signals corresponding to the sounding frame are transmitted from the equipment A to the equipment Z following, for a part of them, the propagation path $t_1$ and, for the other part, the propagation path $t_2$. In the example described here, a main part of these signals follows the propagation path $t_2$, whereas a secondary part of the signals follows the propagation path $t_1$, which is shorter. In the step E22, from the received signals corresponding to the frame CSF, the equipment Z detects the different propagation paths followed by these signals, and in particular the first propagation path, or the shortest path, and the strongest propagation path, $t_2$, by applying a technique, known to those skilled in the art and not explained here, for detecting propagation paths. In the step E23, the equipment Z then estimates a difference in time of flight ΔTOF between the strongest propagation path $t_2$, corresponding to the path for which the measurement of the first time of flight $TOF_1$ has been carried out, and the first propagation path $t_1$. In other words, the estimated difference in time of flight ΔTOF corresponds to the difference between the time of flight of the signals that have followed the strongest propagation path $t_2$ and the time of flight of the signals that have followed the first propagation path $t_1$.

To obtain good accuracy in the measurement, it is essential for the properties of the channel to remain stationary, in other words, not to change significantly, between the estimation of the first time of flight $TOF_1$ and the estimation of the difference in time of flight ΔTOF. To limit this risk, the duration T of the step E20 must be adapted for the overall duration of the phase 1 for estimating the first time of flight $TOF_1$ and the phase 2 for estimating a difference in time of flight ΔTOF to be less than or equal to the channel coherence time, defined as the time during which the properties of the channel do not change significantly. Optionally, to check whether the channel has indeed remained stationary throughout the estimation of the first time of flight $TOF_1$ and the estimation of the difference in time of flight ΔTOF, it is possible to repeat, after the phase 2, a new phase for estimating a first time of flight, similar to the phase 1 described previously. A new first time of flight is thus estimated, denoted $TOF_{1a}$. If the first two times of flight, $TOF_1$ and $TOF_{1a}$, are coherent, this means that the channel has remained constant during the two phases 1 and 2. Otherwise, this means that the accuracy of the measurement is compromised.

After the phase 1 for estimating a first time of flight $TOF_1$ and the phase 2 for estimating a difference in time of flight ΔTOF, the method comprises a phase 3 for calculating the distance between the two equipments A and Z. This phase 3 comprises the steps E30 and E31. In the step E30, the equipment Z determines a second time of flight $TOF_2$ by subtracting the estimated difference in time of flight ΔTOF from the estimated first time of flight $TOF_1$, the value of which has been transmitted to it by the equipment A in the step E21 for transmission of the sounding frame:

$$TOF_2 = TOF_1 - \Delta TOF \quad (1)$$

Then, in the step E31, the equipment Z calculates the straight-line distance D between the two equipments A and Z, from the duly determined second time of flight $TOF_2$ and from the speed V of the electromagnetic wave:

$$D = V * TOF_2 \quad (2)$$

If it wants to, the equipment Z can then communicate to the equipment A the estimated value of the distance D by sending a single data frame, of short duration. The equipment Z could also broadcast this data frame to all the equipments located in its radio range area, or in this case the equipments B and C, to enable them to position themselves relative to each other.

Instead of being carried out by the equipment Z, the phase 3 for calculating the distance D could be carried out by the equipment A. In this case, at the end of the phase 2 for estimating the difference in time of flight, the equipment Z would communicate to the equipment A the estimated difference in time of flight, by sending a single data frame, and it would not need to transmit to the equipment Z the value of the first time of flight $TOF_1$ estimated by the equipment A. In another variant, the two equipments A and Z could carry out the calculation phase 3 in parallel, provided that A communicates to Z the value of the estimated first time of flight $TOF_1$ and that Z communicates to Z the value of the estimated difference in time of flight ΔTOF.

Figure 4A:
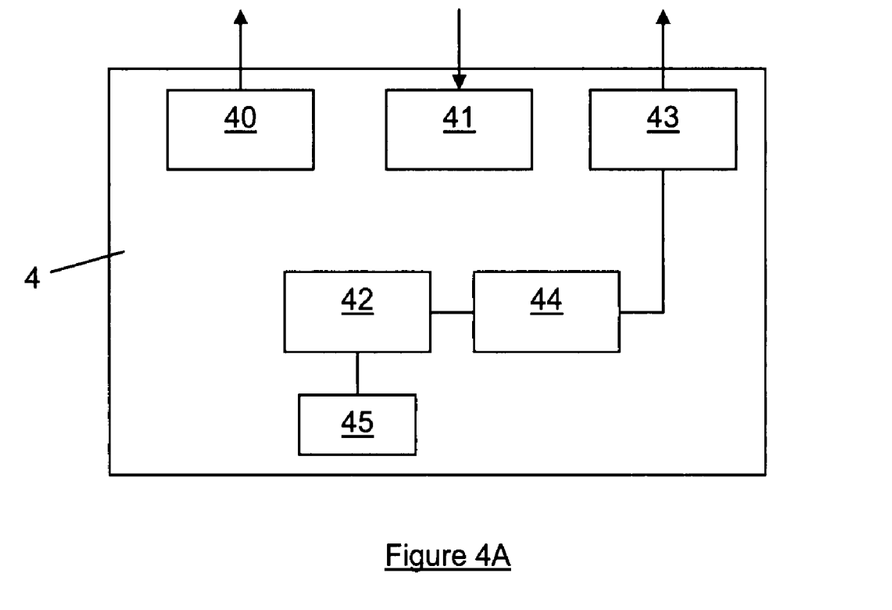
FIGS. 4A and 4B represent respective functional block diagrams of two equipments, one carrying out a first estimation of the distance between the two equipments and the other polled for this estimation, according to particular embodiments, suitable for applying the method of FIGS. 2 and 3.

FIG. 4A shows a functional block diagram of a device 4 for estimating the distance between two equipments, one initiator and the other polled. This device 4 is intended to be incorporated in a radio equipment initiating the distance estimation, such as the equipment A in FIG. 1, comprising a radio transmission and reception interface. The device 4 comprises:

- a module 40 for sending to a polled equipment a request REQ for the purposes of measuring an exchange time between the two equipments, intended to control the sending of a request REQ via the radio interface of the equipment, as described in the step E10 and to signal this sending to a module 42 for measuring the exchange time;
- a module 41 for receiving an acknowledgement ACK in response to the request REQ, intended to monitor the reception of the acknowledgement by the radio interface of the equipment and to signal it to the module 42 for measuring the exchange time and to a module 43 for sending a frame CSF;
- the module 42 for measuring the exchange time $T_{ex}$ between the two equipments, linked to the modules 40 and 41, arranged to initiate a count of the time on the sending of the request REQ by the module 40 and to stop it;
- the module 43 for sending a channel sounding frame CSF to the polled equipment, linked to the module 41 and arranged to control the transmission of a frame CSF via the radio interface of the equipment, after having allowed a time T to elapse, counted from the time of arrival of the acknowledgement ACK, as described in steps E20 and E21;
- an internal clock 44, linked to the modules 42 and 43; and
- a storage memory 45 arranged to memorize the time of transmission of the request REQ and the time of arrival of the acknowledgement ACK.

The modules of the device 4 described above are linked to a central control unit of the equipment, not shown, which is intended to control their operation. This can be software modules of a computer program. The invention therefore also relates to a computer program for a device for estimating the distance between two equipments, comprising code instructions for controlling the execution of those of the steps of the method described previously that are performed by the initiating equipment A. This program can be stored in or transmitted by a data medium, which can be a hardware storage medium, for example a CD-ROM, a magnetic diskette or a hard disk, or even a transmissible medium such as an electrical, optical or radio signal.

Figure 4B:
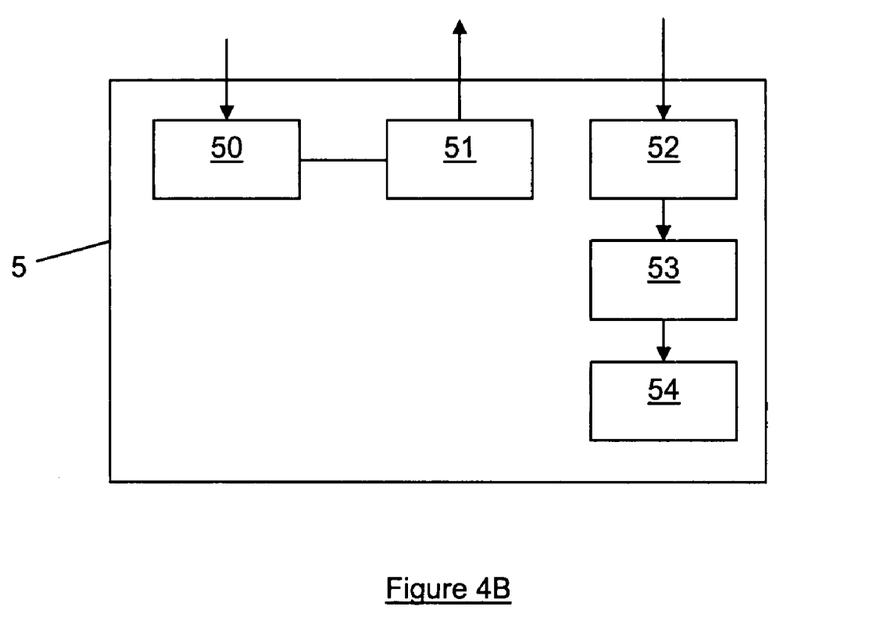

FIG. 4B shows a functional block diagram of a device 5 for estimating the distance between two equipments, one initiator and the other polled. This device 5 is intended to be incorporated in the radio equipment polled to estimate the distance, such as the equipment Z in FIG. 1, comprising a radio transmission and reception interface. It comprises:

- a module 50 for receiving a request REQ for the purposes of measuring an exchange time between the two equipments, arranged to detect the reception of such a request by the radio interface of the equipment;
- a module 51 for transmitting an acknowledgement, arranged to control the transmission of an acknowledgement ACK by the radio interface of the equipment, in response to a request REQ received, after having allowed a wait time $T_w$ to elapse, counted from the time of arrival of the request, as described in the steps E12 and E13;
- a module 52 for receiving and analyzing a channel sounding frame, arranged to detect the reception of the sounding frame by the radio interface of the equipment, extract from it, where appropriate, the value of a first transmitted time of flight $TOF_1$ and detect a first propagation path and the strongest propagation path, from the received signals corresponding to the sounding frame;

a module 53, linked to the module 52, for estimating a difference in time of flight ($\Delta TOF$) between the strongest propagation path and a first propagation path, both detected by the module 52;

a module 54, linked to the module 53, for calculating the distance between the two equipments, arranged to calculate a second time of flight by subtracting the estimated difference in time of flight ($\Delta TOF$) from the first transmitted time of flight and for calculating said distance from the determined second time of flight, as described in the steps 30 and 31.

The modules of the device 5 described above are linked to a central control unit for the equipment, not represented, which is intended to control their operation. It can be software modules of a computer program. The invention therefore also relates to a computer program for a device for estimating the distance between two equipments, comprising code instructions for controlling the execution of those of the steps of the method described previously that are carried out by the polled equipment Z. This program can be stored in or transmitted by a data medium, which can be a hardware storage medium, for example a CD-ROM, a magnetic diskette or a hard disk, or even a transmissible support such as an electrical, optical or radio signal.

Generally, the equipments comprise both a device 4 and a device 5 in order to be able to act as both of the equipments A and Z in the method described previously.

The invention also relates to the radiocommunication system comprising a polled equipment and at least one initiating equipment.

In the first embodiment described previously, the phase 1 for estimating a first time of flight is carried out before the phase 2 for estimating a difference in time of flight. In a second embodiment, the order of these two phases is reversed: the phase 2 for estimating a difference in time of flight is carried out before the phase 1 for estimating a first time of flight.

In a third embodiment, the phase 1 for estimating a first time of flight comprises several successive iterations of all the steps E10 to E16. Thus, the equipment A obtains several consecutive estimations of the first time of flight $TOF_1$, from which it determines an average first time of flight $TOF_{1avg}$ by calculating an average of the different estimations obtained. In the phase 3, it is this first average time of flight $TOF_{1avg}$ which is used to calculate the second time of flight $TOF_2$ using the formula (1). By taking the average of several estimations of the first time of flight, it is possible to reduce the risk of measurement error.

In the preceding description, it is assumed that the two equipments A and Z are asynchronous, such that it is necessary to measure an exchange time $T_{ex}$ between the two equipments A and Z in order to deduce from it a first time of flight. The invention could, however, be applied to the case where the two equipments were synchronous. In this case, it would be sufficient to measure the transmission time of a data frame to go, for example, from A to Z along the strongest path to deduce therefrom a first time of flight $TOF_1$.

There now follows a description of a method of locating the equipment Z. It is assumed here that Z is a mobile equipment arriving in the ad hoc network formed by the three equipments A, B and C of known respective positions $P_A$, $P_B$ and $P_C$. The equipment Z is placed in a position $P_Z$ to be determined. To locate the equipment Z, each of the three equipments A, B and C, called "interrogating equipments", applies the steps E10, E14 to E16, E20 and E21, described previously, whereas the equipment Z, called "interrogated equipment", applies the steps E11 to E13, E22, E23, E30 and E31, described previously. Thus, it is the three interrogating equipments A, B and C, namely those that have initiated the estimation of the distance between themselves and the interrogated equipment Z, which send the three channel sounding frames, respectively. This makes it possible, on the one hand, to spread the load of the transmission of the three channel sounding frames over the three interrogating equipments A, B and C and not on the new node Z alone and, on the other hand, better distribute the electromagnetic energy in space by avoiding the transmission of three fairly energy-intensive frames from the same location. The ad hoc network, knowing the distances $D_{AZ}$ between A and Z, $D_{BZ}$ between B and Z, $D_{CZ}$ between C and Z, and the positions $P_A$, $P_B$ and $P_C$ of the three equipments A, B and C, can deduce from these the position $P_Z$ of the equipment Z.

It would similarly be possible to use the locating method that has just been described to locate an equipment Z in space, by carrying out the estimation of the distance between Z and at least four other equipments A, B, C and D of known respective separate positions.

In the above description, the radio equipments are sensors. Of course, they could be any other type of radio equipments such as communication terminals or communicating objects. The present invention is suited to ultra-wideband pulsed radio but is also applicable to other radio systems (DS-SS, etc.).

The invention claimed is:

1. A method of estimating the distance between a first and a second radio equipment, comprising the steps of:
    a phase (1), applied by the first equipment (A), for estimating a first time of flight between the two equipments (A, Z) corresponding to the signal transmission time to go from one equipment to the other along a propagation path, called the "strongest path", taken by a main part of the energy of the signals;
    a phase (2) for estimating a difference in time of flight comprising the sending of a channel sounding frame from one equipment to the other (E21) and, from the received radio signals corresponding to said channel sounding frame, estimating a difference in time of flight ($\Delta TOF$) between the strongest propagation path and a first propagation path (E22); and
    a phase (3) for calculating the distance between the two equipments (A, Z) comprising the determination of a second time of flight ($TOF_2$) by subtracting the estimated difference in time of flight ($\Delta TOF$) from the estimated first time of flight ($TOF_1$) (E30) and calculating the distance (D) between the two equipments from the duly determined second time of flight ($TOF_2$) (E31),
    wherein the first equipment (A) sends to the second (Z) said channel sounding frame (E21), the estimating of the difference in time of flight (E22) being performed by the second equipment (Z).

2. The method as claimed in claim 1, wherein the first equipment (A) transmits to the second equipment (Z) the value of the estimated first time of flight ($TOF_1$) (E21) and it is the second equipment (Z) which estimates the second time of flight ($TOF_2$) (E30) and deduces from this the distance (D) between the two equipments (E31).

3. The method as claimed in claim 1, wherein the second equipment (Z) transmits to the first (A) the estimated distance value (D) between the two equipments (A, Z).

4. The method as claimed in claim 1, wherein, the second equipment (Z) sending an acknowledgement in response to a request from the first equipment (A) (E12) in the phase (1) for estimating the first time of flight, the first equipment allows a time T to elapse between the time of arrival of the acknowledgement and the time of transmission of the channel sounding frame (E20), said time T comprising a guard time adapted to allow the first equipment to estimate the first time of flight ($TOF_1$) followed by a pause time adapted to comply with the conditions of shared access to the channel and being adapted for the total duration of the phase (1) for estimating the first time of flight and the phase (2) for estimating a difference in time of flight to be less than the coherence time of the channel.

5. The method as claimed in claim 1, wherein, in the phase (1) for estimating the first time of flight, the second equipment (Z) allows a wait time ($T_w$) (E11) to elapse, said time being known to both equipments, between the moment when it receives a request from the first equipment and the moment when it sends an acknowledgement in response, and the first equipment (A) measures the duration of the interchange between the two equipments (E15), subtracts said wait time from the measured exchange duration and divides the result of the subtraction by two in order to estimate the first time of flight ($TOF_1$) (E16).

6. The method as claimed in claim 1, wherein, the phase (1) for estimating a first time of flight comprises several estimations of the first time of flight ($TOF_1$) and, from the different estimations of the first time of flight, the first equipment calculates an average first time of flight.

7. A method of locating an equipment to be located (Z) by a set of at least three other equipments (A, B, C), wherein each of the other three equipments (A, B, C) of said set applies those of the steps performed by the first equipment in the method of claim 1, and whereas the equipment to be located (Z) applies those of the steps performed by the second equipment in the method as claimed in claim 1.

8. A device for estimating the distance between a first and a second equipment, said device being adapted to be incorporated in the first equipment and comprising means (40) for sending to the second equipment a request for measuring an exchange duration between the first and second equipments, means (41) for receiving an acknowledgement in response to the request, means (42, 44, 45) for measuring the duration of the exchange between the first and second equipments to estimate a first time of flight, means (43) for sending a channel sounding frame to the second equipment, means for receiving a difference in time of flight ($\Delta TOF$) between the strongest propagation path, taken by a main part of the signal corresponding to said channel sounding frame, and a first propagation path, and means (54) for determining a second time of flight by subtracting the difference in time of flight ($\Delta TOF$) from the estimated first time of flight and for calculating said distance between the first and second equipment from the determined second time of flight.

9. A device for estimating the distance between a first and a second equipment, said device being adapted to be incorporated in the second equipment and comprising means (51) for, on receiving a request for measuring an exchange duration between the first and second equipments, sending an acknowledgement, means (52, 53) for receiving a channel sounding frame and, from the received radio signals corresponding to said channel sounding frame, for estimating a difference in time of flight ($\Delta TOF$) between the strongest propagation path, taken by a main part of the energy of the signals received, and a first propagation path, means (50) for receiving the value of an estimated first time of flight and means (54) for determining a second time of flight by subtracting the difference in time of flight ($\Delta TOF$) from the estimated first time of flight and for calculating said distance between the first and second equipment from the determined second time of flight.

10. A system comprising an equipment (Z) and at least one other equipment (A), wherein said equipment (Z) comprises a device as claimed in claim 9 and said other equipment (A) comprises a device for estimating the distance between a first and a second equipment, said device being adapted to be incorporated in the first equipment and comprising means (40) for sending to the second equipment a request for measuring an exchange duration between the two equipments, means (41) for receiving an acknowledgement in response to the request, means (42, 44, 45) for measuring the duration of the exchange between the two equipments, and means (43) for sending a channel sounding frame to the second equipment.

11. A non-transitory computer readable medium storing a computer program for a device for estimating the distance between two equipments, the computer program comprising code instructions for controlling the execution of those of the steps of the method as claimed in claim 1 that are performed by the first equipment.

12. A non-transitory computer readable medium storing a computer program for a device for estimating the distance between two equipments, the computer program comprising code instructions for controlling the execution of those of the steps of the method as claimed in claim 1 that are performed by the second equipment when the program is executed by said device.

* * * * *